(12) United States Patent
Tuzuki et al.

(10) Patent No.: US 6,310,757 B1
(45) Date of Patent: Oct. 30, 2001

(54) ELECTRONIC COMPONENT HAVING EXTERNAL ELECTRODES AND METHOD FOR THE MANUFACTURE THEREOF

(75) Inventors: Kiyoshi Tuzuki; Sachiko Kawamura, both of Takasaki (JP)

(73) Assignee: Taiyo Chemical Industry Co., Ltd., Gunma (JP)

( * ) Notice: Subject to any disclaimer, the term of this patent is extended or adjusted under 35 U.S.C. 154(b) by 0 days.

(21) Appl. No.: 09/621,601

(22) Filed: Jul. 21, 2000

(30) Foreign Application Priority Data

Jul. 23, 1999 (JP) .................................................. 11-208823

(51) Int. Cl.[7] ..................................................... H01G 2/20
(52) U.S. Cl. .................. 361/308.1; 361/309; 361/321.2; 29/25.41
(58) Field of Search ............................... 361/308.1, 306.3, 361/309, 310, 321.2, 321.3, 321.4, 321.5; 29/25.41, 25.42

(56) References Cited

U.S. PATENT DOCUMENTS

| | | | |
|---|---|---|---|
| 5,426,560 | * | 6/1995 | Amaya et al. ........................ 361/309 |
| 6,002,577 | * | 12/1999 | Wada et al. ......................... 361/312 |
| 6,071,800 | * | 6/2000 | Shigemoto et al. ................. 438/612 |

* cited by examiner

*Primary Examiner*—Anthony Dinkins
(74) *Attorney, Agent, or Firm*—Rosenman & Colin, LLP.

(57) ABSTRACT

There are provided an electronic component having external electrodes and a method for manufacturing thereof for which treatment of the wastewater is not needed and has electrolytically plated layers which are substantially plated only on the conductive layers but not on the ceramic surfaces. In the method for manufacturing the electronic component, an activation treatment is performed in which palladium is deposited on a conductive layer on the electronic component, and then electrolytic Ni plating and electrolytic solder plating are performed sequentially.

7 Claims, 1 Drawing Sheet

ELECTRONIC COMPONENT HAVING EXTERNAL ELECTRODES AND METHOD FOR THE MANUFACTURE THEREOF

FIELD OF THE INVENTION

The present invention relates to an electronic component having external electrodes and method for the manufacture thereof.

BACKGROUND OF THE INVENTION

Chip-shaped electronic components such as multilayer ceramic capacitors or chip resistors are widely used as electronic elements for printed circuit boards or multilayer substrates.

Multilayer ceramic capacitors are typically manufactured by employing following steps: first, conductive paste is applied to green sheets of dielectric ceramic material to form an internal electrodes pattern, the green sheets having internal electrodes pattern are stacked and compressed to form a laminated body and this laminated body is then diced into separate capacitor elements in such a manner that successive internal electrodes are exposed at opposite end portions of the capacitor elements, after which external electrodes are formed on the opposite end portions of the capacitor elements.

When manufacturing chip resistors, first, resistor films such as metal films are disposed on ceramic substrate to form resistor bodies, the surfaces thereof are coated with protecting films and external electrodes are then formed on opposite end portions of the resistor bodies.

These external electrodes are soldered onto solder lands of the printed circuit board in order to connect the electronic components to outer circuit system. And, it is preferred that the external electrodes have heat resistance in order to prevent solder leaching and also solder wettability. These requirements can be fulfilled by using a plurality of layers composed of different metals as external electrodes. Therefore, when forming external electrodes on chip-shaped electronic components such as multilayer ceramic capacitor, chip resistor, or the like, a plurality of electrode layers composed of different materials are disposed on opposite end portions of the electronic components.

As to the multilayer ceramic capacitors, a conductive layer may be formed by applying conductive paste on the opposite end portions of sintered capacitor elements and baking the conductive paste. Or, a conductive layer can be formed by applying conductive paste on the opposite portions of unsintered capacitor elements and co-sintering them. The conductive paste is prepared by mixing an oxidizable metal such as Ni powder with a resin. The surfaces of the metal powder included in the conductive paste are usually oxidized and especially during the baking, they become more seriously oxidized due to the high temperature such that they cannot be electrolytically plated. Therefore, electroless Cu plating or electroless Ni plating has been used in order to form the heat resisting layer and then electrolytic plating is performed on the heat resisting layer.

The electroless Cu plating is performed by immersing an object into a solution containing a reducing agent and a complexing agent. An aqueous solution of sodium hydroxide containing formalin as a reducing agent and ethylenediaminetetraacetic acid (EDTA) as a complexing agent is usually used as the solution for the electroless Cu plating, which causes the production of sodium formate as well as Cu metal during the electroless plating process. Therefore, the treatment of wastewater containing formalin and sodium formate is needed and costs for pollution control systems are incurred.

Further, as nonconductive materials such as plastics can also be plated by electroless plating, electroless plated layers may be formed on the ceramic surfaces as well as on the conductive layers, which is called over-grow, and, when electronic components are soldered onto the printed circuit board having compact wiring patterns, the printed circuit board can be short-circuited by the electroless plated layers on the ceramic surfaces of the electronic elements.

SUMMARY OF THE INVENTION

It is, therefore, an object of the present invention to provide an electronic component having external electrodes and a method for manufacturing thereof for which treatment of the wastewater is not needed.

It is another object of the present invention to provide an electronic component having external electrodes which have electrolytically plated layers plated only on the conductive layer but not on the ceramic surfaces and a method for manufacturing thereof.

It is still another object of the present invention to provide an electronic component having external electrodes and a method for manufacturing thereof which can be soldered onto a printed circuit board having compact wiring.

In accordance with a preferred embodiment of the present invention, there is provided an electronic component having external electrodes, which comprises:
  a first layer including an oxidizable metal as a major component;
  a second layer disposed on the first layer and including a metal which has smaller ionization tendency than the oxidizable metal; and
  at least one electrolytically plated layer including a heat resisting layer and a solder wettable layer.

The first layer may be a film formed by baking and including the oxidizable metal. Preferably, the oxidizable metal is selected from the group consisting of copper and base metal, and, more preferably, nickel, and the like. The metal included in the second layer may be selected from the group consisting of gold, silver, platinum, copper and palladium, and the like, and, more preferably, palladium. Preferably, the heat resisting layer is an electrolytic Ni plated layer and the solder wettable layer is a solder plated layer.

The external electrode may further comprise a fourth layer, preferably Cu layer, which is electrolytically plated on the second layer and softer than the heat resisting layer.

In accordance with another preferred embodiment of the present invention, there is provided a method for manufacturing an electronic component having external electrodes, which comprises the steps of:
  forming a first layer on a body of the electronic component, the first layer including an oxidizable metal as a major component;
  forming a second layer on the first layer by utilizing cations of a metal having a smaller ionization tendency than the oxidizable metal; and
  forming at least one electrolytically plated layer having a heat resisting layer and a solder wettable layer.

Preferably, the method further comprises a step of pretreating the first layer in order to remove oxidants from the surface thereof before the second layer forming step.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
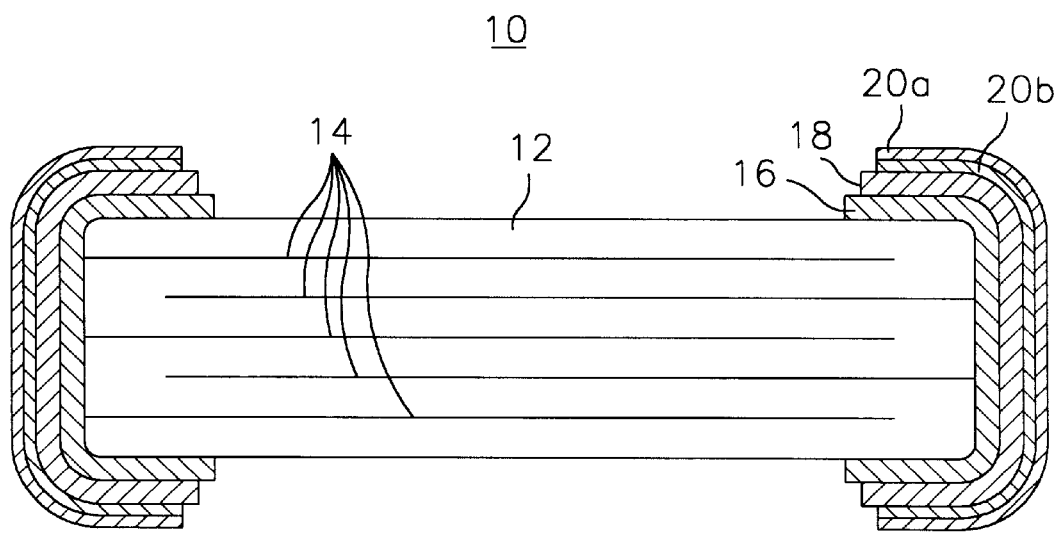
FIG. 1 shows a cross-sectional view of a multilayer ceramic capacitor in accordance with a preferred embodiment of the present invention.
Figure 2:
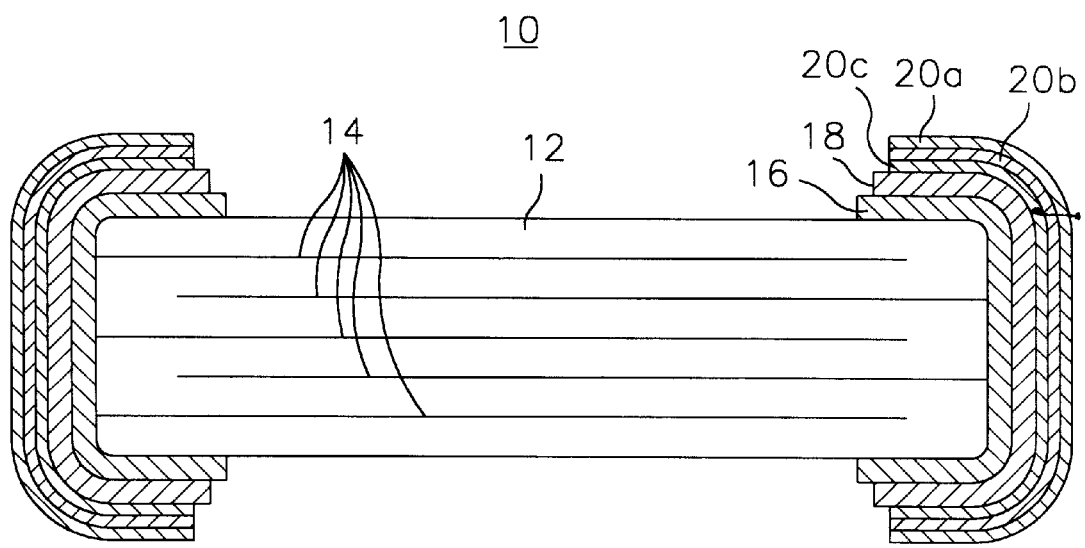
FIG. 2 illustrates a cutaway view of a multilayer ceramic capacitor in accordance with another preferred embodiment of the present invention.

Examples in accordance with the present invention will be described hereinafter with reference to the accompanying drawings and then will be compared with Comparative Examples. The following Examples are intended to exemplify the present invention, but are not to be construed to limit the scope of the present invention.

EXAMPLE 1

First, ceramic slurry was prepared by mixing a dielectric ceramic material with a binder. A ceramic green sheet was obtained by thinly coating the slurry on a polyethylene terephthalate film. Then, conductive paste was prepared by mixing Pd powder with a binder. This conductive paste was applied to the ceramic green sheet to form internal electrodes pattern thereon. Next, the ceramic green sheets having internal electrodes pattern were stacked and compressed to form a laminated body and this laminated body was then diced into separate capacitor elements in such a manner that successive internal electrodes were exposed at opposite end faces of the capacitor elements.

Conductive paste for external electrodes was prepared by mixing Ni powder with a binder and dissolving the mixture in α-terpineol. The conductive paste had viscosity of 100 poises at room temperature, i.e., 25° C. and was applied on a plate to form a paste layer having a thickness of 0.4 mm. Then, one end portion of each capacitor element in the hexahedral shape was dipped into the paste layer and then dried. Similarly, the other portion of the capacitor element was dipped into the paste layer and then dried.

A plurality of sintered capacitor elements having a conductive layer 16 on each opposite end potions thereof were obtained by sintering the capacitor elements having conductive paste applied to the opposite end portions through the process mentioned above. Each sintered capacitor element had a size of 1.0 mm×0.5 mm×0.5 mm and the thickness of the conductive layer 16 was 15 µm.

A pretreatment process was performed as followings:

Five thousand(5000) capacitor elements were charged into a barrel having a volume of 100 ml and filled with acid liquid, e.g., $H_2O_2$, an alkali solution, e.g., sodium hypophosphate. The barrel was rotated at a rotational speed of 8 rpm for 3 minutes. The oxides were removed from the surfaces of the conductive layers 16 during the rotation of the barrel.

Next, Pd deposition was performed as followings:

After the pretreatment, the capacitor elements were washed by water and immersed into a palladium chloride solution for 9 minutes; the palladium chloride solution contained 0.05 g/l of palladium chloride, 2 ml/l of hydrochloric acid (36% aqueous solution) and water per 1 liter of the solution. It was found by using XRF measurement that Pd layer 18 having a thickness of 0.05 µm and Pd nucleus were formed on the conductive layer 16.

Finally, electrolytic plating was performed as followings:

After the Pd deposition, the capacitor elements were electrolytic Ni plated and then electrolytic solder plated. The electrolytic Ni plating was performed in a Ni chloride aqueous solution by applying a current with density of 0.2 $A/dm^2$ for 60 minutes and the electrolytic solder plating was performed in a Sn/Pb chloride aqueous solution by applying a current with density of 0.1 $A/dm^2$ for 60 minutes.

Through above processes were formed multilayer ceramic capacitors 10 having external electrodes including the conductive layer 16, the electrolytic Ni plated layer 20b and the electrolytic solder plated layer 20a.

The electrolytic Ni plating was performed several times, each for duration corresponding to different reaction time, i.e., 10, 20 and 30 minutes, and the thickness of the Ni layers 20b for each case was measured. The results are shown in Table 1.

The multilayer ceramic capacitors 10 were ground and the thickness of Ni layers 20b thereof was measured. The thicknesses of other layers were measured by XRF measurement or above method.

EXAMPLE 2

Multilayer ceramic capacitors 10 were prepared and measured in the same manner as Example 1 except that: pretreatment was not performed.

The results are also shown in Table 1.

Comparative Example 1

Multilayer ceramic capacitors 10 were prepared and measured in the same manner as Example 1 except that: Pd deposition was not performed.

The results are also shown in Table 1.

Comparative Example 2

Multilayer ceramic capacitors 10 were prepared and measured in the same manner as Comparative Example 1 except that: pretreatment was not performed.

TABLE 1

|  | Comparative Example 1 | Comparative Example 2 | Example 1 | Example 2 |
| --- | --- | --- | --- | --- |
| Pd deposition | Not Performed | Not Performed | Performed | Performed |
| Pretreatment | Performed | Not Performed | Performed | Not Performed |
| Reaction Time |  |  |  |  |
| 10 min | 0.00 µm | 0.02 µm | 0.25 µm | 0.18 µm |
| 20 min | 0.01 µm | 0.03 µm | 0.60 µm | 0.39 µm |
| 30 min | 0.02 µm | 0.07 µm | 0.69 µm | 0.59 µm |

The thickness of the Ni layers 20b in Example 2 was 9 times that of Ni layers 20b in Comparative Example 1 when the reaction time in Example 2 was a third of that in Comparative Example 1, 18 times when the reaction time was two thirds, and 30–40 times when the reaction time was same. Further, the thickness of the Ni layers 20b in Example 1 was thicker than that of Ni layers 20b in Example 2 by 39%, 54% or 17% when the reaction time was same. From these results, one can deduce that the thickness of Ni layers 20b was significantly increased by performing Pd deposition. This was more apparently inferred from the fact that the thickness of the Ni layers in Comparative Example 2 when the pretreatment was not performed was thicker than that of Ni layers 20b in Comparative Example 1 when the pretreatment was performed.

It can be concluded that the pretreatment makes the amount of deposited palladium increased, on which electrolytic Ni plating is performed, and in turn the generation rate of the electrolytic Ni plated layer becomes faster.

EXAMPLE 3

Five hundred(500) multiplayer ceramic capacitors 10 were prepared and measured as were in Example 1 except that: Pd deposition was performed several times, each for duration corresponding different reaction time, i.e., from 3 to 18 minutes at an interval of 3 minutes and the electrolytic Ni plating was performed. The number of capacitors on which over-grow of Ni plating could be observed was examined. The results are shown in TABLE 2.

TABLE 2

| | Example 3 | |
| --- | --- | --- |
| Reaction Time (Pd deposition) | Ni layer Thickness | Over-grow |
| 3 min | 1.68 μm | 0/500 |
| 6 min | 2.02 μm | 0/500 |
| 9 min | 2.81 μm | 0/500 |
| 12 min | 3.13 μm | 20/500 |
| 18 min | 2.98 μm | 13/500 |

From the result, one can deduce that, as the reaction time of the Pd deposition was increased, the thickness of electrolytic Ni plated layer increased. However, if the Pd deposition was performed for more than 9 minutes, there were found no further substantial increase in the thickness of the Ni layer 20b. Over-grow of Ni layer 20b was found in some capacitors when Pd treatment was performed for more than 12 minutes.

In order to prevent over-grow of Ni layer and degradation of humidity resistance, less than 9 minutes of reaction time is preferable for Pd deposition. When Pd deposition was performed for more than 9 minutes, the amount of deposited palladium was increased, which in turn caused over-grow of Ni layer. On the other hand, when Pd deposition was performed for less than 6 minutes, the discontinuity of Ni layer 20b was developed, which caused non-uniform solder plated layer 20a. In order to prevent this defect, it was found that more than 6 minutes of reaction time was preferable for Pd deposition.

In conclusion, about 6 to about 9 minutes of reaction time is preferable for Pd deposition; however, all the measurements in TABLE 2 show substantial improvements over prior art in view of preventing over-grow of Ni layer.

EXAMPLE 4

Multilayer ceramic capacitors were prepared and measured in the same manner as Example 2 except that: electrolytic Cu plating was performed additionally before the Ni plating.

The thickness of Cu layers 20c and Ni layers are shown in TABLE 3.

Ni layer 20b is rather hard to alleviate stresses by itself. But, if the electrolytic Cu plated layer 20c is provided under the Ni layer 20b, stresses can be alleviated. Moreover, delamination of electrodes, which means delamination of Ni layer 20b itself or delamination of Ni layer 20b and solder layer 20a, can be prevented and the development of cracks can also be prevented. So, the electrolytic Cu plated layer 20c can be mentioned as an electrolytic plated relief layer.

If delamination of electrode or crack is developed in the external electrodes, the humidity resistance can easily be degraded. The degradation of humidity resistance was examined and compared with that of the multilayer ceramic capacitors prepared in Example 2. The results are also shown in TABLE 3.

From the result, one can find that the degradation of humidity resistance decreased by a half, which means that the delamination and crack development were suppressed.

TABLE 3

| | Cu layer Thickness | Ni layer Thickness | Degradation of Humidity Resistance |
| --- | --- | --- | --- |
| Example 2 | — | 2.51 μm | 5/200 |
| Example 4 | 1.04 μm | 3.05 μm | 2/200 |

In the Examples, the activation treatment, i.e., Pd deposition, was performed by using palladium chloride solution. However, the activation treatment may be performed by using acid solution containing palladium, and alkali solution or organic solutions may be used instead of the acid solution. Further, additives such as amine may be added. Palladium was added as a cation to be transformed into metallic palladium, thereby becoming a component of Pd layer. Palladium may also be provided as a complex. The conductive layer may be treated by using anionic surfactant to thereby promote the deposition of palladium. Electrolytic plating or methods other than immersion method can be used. Further, so-called direct plating utilizing palladium/tin colloid may also be adopted. In particular, palladium metal reducing method is preferable and alkali bath including a small amount of Cu ion can be used in the method.

Metals having relatively small ionization tendency such as gold, silver, platinum and copper, or alloy thereof can be used instead of palladium.

As to the electrolytic Ni plating, metals other than Ni can be used unless they provoke solder leaching. Also, solder wettable metals such as gold, tin or tin alloy can be used for the electrolytic solder plating. In order to prevent using poisonous lead, other metal such as bismuth can be adopted. The solder plated layers may include a plurality of layers composed of a simple substance or a mixture of such metals.

For the electrolytic plating of relief layer 20c as in Example 4, the metal for plating may be selected from the group consisted of copper, zinc, silver, tin, alloys of these metals or with other metals, and the like.

Examples described above can also be applicable to electronic components having external electrodes other than multilayer ceramic capacitor.

When palladium chloride solution was used, the metal ion in the wastewater could be separated just by increasing pH of the solution above a value of 7.

There are provided an electronic component having external electrodes and a method for manufacturing thereof for which treatment of the wastewater is not needed and has electrolytically plated layers which are substantially plated only on the conductive layer but not on the ceramic surfaces.

Also, there are provided an electronic component having external electrodes and a method for manufacturing thereof which can be soldered onto a printed circuit board having compact wiring pattern.

While the present invention has been described with respect to the particular embodiments, it will be apparent to those skilled in the art that various changes and modifications may be made without departing from the spirit and scope of the invention as defined in the following claims.

What is claimed is:

1. An electronic component having external electrodes, the external electrodes comprising:

a first layer including an oxidizable metal as a major component;

a second layer disposed on the first layer and including a metal having smaller ionization tendency than the oxidizable metal; and at least one electrolytically plated layer including a heat resisting layer and a solder wettable layer.

2. The electronic component of claim 1, wherein the first layer is a film formed by baking and including the oxidizable metal which is at least one selected from the group consisting of copper and base metal, the metal included in the second layer is at least one selected from the group consisting of gold, silver, platinum, copper and palladium, the heat resisting layer is an electrolytic Ni plated layer and the solder wettable layer is a solder plated layer.

3. The electronic component of claim 2, wherein the oxidizable metal is nickel and the metal included in the second layer is palladium.

4. The electronic component of claim 1, wherein the external electrode further comprises a fourth layer which is electrolytically plated on the second layer and softer than the heat resisting layer.

5. The electronic component of claim 4, wherein the fourth layer is an electrolytic Cu plated layer.

6. A method for manufacturing an electronic component having external electrodes, the method comprising:

forming a first layer on a body of the electronic component, the first layer including an oxidizable metal as a major component;

forming a second layer on the first layer by utilizing cations of a metal having a smaller ionization tendency than the oxidizable metal; and forming at least one electrolytically plated layer having a heat resisting layer and a solder wettable layer.

7. The method of claim 6, wherein the method further comprising a step of pretreating the first layer in order to remove oxides from the surface thereof before the second layer forming step.

* * * * *